United States Patent
Fujiwara et al.

(10) Patent No.: US 12,044,883 B2
(45) Date of Patent: Jul. 23, 2024

(54) OPTICAL WAVEGUIDE AND MANUFACTURING METHOD THEREOF

(71) Applicant: Nippon Telegraph and Telephone Corporation, Tokyo (JP)

(72) Inventors: Yuji Fujiwara, Musashino (JP); Satomi Katayose, Musashino (JP); Ryoichi Kasahara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 318 days.

(21) Appl. No.: 17/613,609

(22) PCT Filed: May 27, 2019

(86) PCT No.: PCT/JP2019/020963
§ 371 (c)(1),
(2) Date: Nov. 23, 2021

(87) PCT Pub. No.: WO2020/240675
PCT Pub. Date: Dec. 3, 2020

(65) Prior Publication Data
US 2022/0236481 A1    Jul. 28, 2022

(51) Int. Cl.
*G02B 6/122*    (2006.01)
*G02B 6/12*    (2006.01)
*G02B 6/13*    (2006.01)

(52) U.S. Cl.
CPC ........... *G02B 6/122* (2013.01); *G02B 6/13* (2013.01); *G02B 2006/12038* (2013.01)

(58) Field of Classification Search
CPC .......... G02B 6/122; G02B 6/13; G02B 6/136; G02B 2006/12038
See application file for complete search history.

(56) References Cited

U.S. PATENT DOCUMENTS

2004/0190848 A1* 9/2004 Ide .................... G02B 6/122
385/129

FOREIGN PATENT DOCUMENTS

| JP | H07-507151 A | 8/1995 |
| JP | 2006-30734 A | 2/2006 |
| JP | 2013-171261 A | 9/2013 |
| JP | 2019-20624 A | 2/2019 |

* cited by examiner

*Primary Examiner* — Michael P Mooney
(74) *Attorney, Agent, or Firm* — Workman Nydegger

(57) ABSTRACT

To manufacture an optical waveguide including a substrate, a lower cladding layer formed on the substrate, a core layer formed on the lower cladding layer, a sinking prevention layer formed to cover the core layer and the lower cladding layer, and an upper cladding layer formed on the sinking prevention layer, in which the sinking prevention layer is composed of a material having a higher melting point than that of a material composing the lower cladding layer.

11 Claims, 2 Drawing Sheets

Prior Art

OPTICAL WAVEGUIDE AND MANUFACTURING METHOD THEREOF

TECHNICAL FIELD

The present invention relates to an optical waveguide for visible light and a method of manufacturing the same.

BACKGROUND ART

Conventionally, a quartz-based planar lightwave circuit (hereinafter referred to as a quartz-based PLC) has been used mainly in an optical communication and optical signal processing system. A waveguide constituting the quartz-based PLC has been designed and produced for an optical communication wavelength, and Ge-doped quartz glass obtained by doping $GeO_2$ into $SiO_2$ has been used for a core material therefor (see, e.g., Patent Literature 1).

The quartz-based PLC is excellent in environment resistance and vibration resistance and has a high reliability, and can constitute an optical system in a smaller size than that of a spatial optical system obtained by combining a lens, a mirror, and the like. In recent years, an attempt to make a visible light device constituted by a spatial optical system smaller in size and more highly functional using the quartz-based PLC has been being made.

However, it has been reported that the loss of an optical waveguide having a core composed of Ge-doped quartz glass, which has been used in an optical communication field, sequentially increases by visible light input. This is because when visible light having higher energy than that of an optical communication wavelength is inputted at a high power density, a color center that absorbs visible light from $GeO_2$ as a dopant of a core material is generated via two photon absorption processes.

In a quartz-based PLC for visible light, a quartz-based PLC using pure quartz glass excluding $GeO_2$ as a core material has promise. In this case, a quartz-based material having a lower refractive index than that of the core material needs to be used for a cladding material, and quartz-based glass having fluorine or boron added thereto has promise as a cladding material.

FIG. 1 illustrates an example of a cross-sectional structure of a conventional optical waveguide including a cladding layer using quartz-based glass having boron and fluorine doped therein. FIG. 1 illustrates an optical waveguide structure including an Si substrate 1 as a support substrate, a lower cladding layer 2 formed on the Si substrate 1, a core layer 3 formed on the lower cladding layer 2 and composed of pure quartz glass, and an upper cladding layer 4 formed on the lower cladding layer 2 and the core layer 3 such that the core layer 3 is embedded therein.

The lower cladding layer 2 and the upper cladding layer 4 are each composed of quartz-based glass having boron or fluorine doped therein. However, quartz-based glass having boron or fluorine added thereto has a lower melting point than that of pure quartz glass as a core material. In a conventional structure illustrated in FIG. 1, there occurs a problem that the core layer sinks into the lower cladding layer because the lower cladding layer is simultaneously softened by thermal treatment required at the time of film formation of the upper cladding layer.

By the sinking, a gap between respective waveguides in directional couplers as basic elements constituting an optical circuit, for example, becomes difficult to control. A characteristic of the optical circuit deteriorates, and besides the sinking unevenly occurs in a wafer surface, thereby also deteriorating the yield of a chip.

To prevent the sinking, a method of using a surface tension acting on a core film by leaving the core film thin on a bottom surface of a rectangular core has been proposed (e.g., Patent Literature 2). FIG. 2 illustrates another example of a cross-sectional structure of a conventional optical waveguide.

FIG. 2 illustrates an optical waveguide structure including an Si substrate 11 as a support substrate, a lower cladding layer 12 formed on the Si substrate 11, a core layer 13 composed of pure quartz glass, an upper cladding layer 14 formed on the lower cladding layer 12 and the core layer 13 such that the core layer 13 is embedded therein, and a core film 15 provided above the lower cladding layer 12 and below the core layer 13 and composed of pure quartz glass.

The lower cladding layer 12 and the upper cladding layer 14 illustrated in FIG. 2 are composed of quartz-based glass having boron or fluorine doped therein. The core film 15 illustrated in FIG. 2 is produced while its thickness is controlled by making an etching depth larger than that of a portion of the core layer 13 in etching in forming the core layer 13 in a rectangular shape from a layer having a uniform thickness.

In a conventional method of solving sinking illustrated in FIG. 2, the thickness of the core film 15 is controlled by etching. However, there occurs a problem that when the thickness of the core film 15 is controlled by etching, the core film 15 having a uniform thickness in a wafer surface cannot be obtained due to a distribution in the wafer surface of an etching rate and a microloading effect that the etching rate changes depending on coarseness and fineness of a waveguide pattern. When the thickness of the core film 15 varies in the wafer surface, a characteristic of a circuit deteriorates, causing a deterioration in yield.

CITATION LIST

Patent Literature

Patent Literature 1: Japanese Patent Laid-Open No. 2013-171261

Patent Literature 2: Japanese Patent Laid-Open No. 2006-030734

SUMMARY OF THE INVENTION

Technical Problem

The present invention is directed to implementing a waveguide structure that can be uniformized by preventing a core layer from sinking into a lower cladding layer by thermal treatment to enable a lower loss of a waveguide for visible light and preventing the waveguide shape of the waveguide for visible light from varying in a wafer surface due to a microloading effect and a distribution in the wafer surface of an etching amount, and a method of manufacturing the same.

Means for Solving the Problem

To solve the above-described problem, an optical waveguide according to an aspect of the present invention is a waveguide including a substrate, a lower cladding layer formed on the substrate, a core layer formed on the lower cladding layer, a sinking prevention layer formed on the core layer to cover the core layer and the lower cladding layer, and an upper cladding layer formed on the sinking prevention layer, in which the sinking prevention layer is composed of a material having a higher melting point than that of a material composing the lower cladding layer.

The optical waveguide according to the aspect of the present invention prevents the core layer from sinking into the lower cladding layer by giving a buoyant force for raising the core layer using a structure including the sinking prevention layer formed to cover the core layer and the lower cladding layer.

The optical waveguide according to the aspect of the present invention and a method of manufacturing the same include the following configurations.

Configuration 1

An optical waveguide including a substrate, a lower cladding layer formed on the substrate, a core layer formed on the lower cladding layer, a sinking prevention layer formed to cover the core layer and the lower cladding layer, and an upper cladding layer formed on the sinking prevention layer, in which the sinking prevention layer is composed of a material having a higher melting point than that of a material composing the lower cladding layer.

Configuration 2

The optical waveguide described in the configuration 1, in which the sinking prevention layer has a smaller thickness than a thickness of the core layer.

Configuration 3

The optical waveguide described in the configuration 1 or 2, in which the core layer is composed of pure quartz glass.

Configuration 4

The optical waveguide described in any one of the configurations 1 to 3, in which the lower cladding layer and the upper cladding layer are each composed of quartz-based glass having a dopant added thereto.

Configuration 5

The optical waveguide described in the configuration 4, in which the dopant contains at least either boron or fluorine.

Configuration 6

A method of manufacturing an optical waveguide, the method including forming a lower cladding layer on a substrate, forming a core layer on the lower cladding layer, patterning the core layer to have a rectangular cross-sectional structure, forming a sinking prevention layer to cover the patterned core layer and the lower cladding layer, and forming an upper cladding layer on the sinking prevention layer.

Configuration 7

The method of manufacturing the optical waveguide described in the configuration 6, in which the sinking prevention layer is composed of a material having a higher melting point than that of a material composing the lower cladding layer, and is formed to have a smaller thickness than a thickness of the core layer.

Configuration 8

The method of manufacturing the optical waveguide described in the configuration 7, in which the sinking prevention layer is formed by deposition to cover the core layer and the lower cladding layer.

Effects of the Invention

According to the present invention, there can be provided an optical waveguide for visible light the loss of which can be reduced by preventing a core layer from sinking into a lower cladding layer in thermal treatment and the waveguide shape of which is prevented from varying in a wafer surface due to a microloading effect and a distribution in the wafer surface of an etching rate, and a method of manufacturing the same.

DESCRIPTION OF EMBODIMENTS

An embodiment of the present invention will be described in detail below with reference to the drawings.

Embodiment

Figure 1:
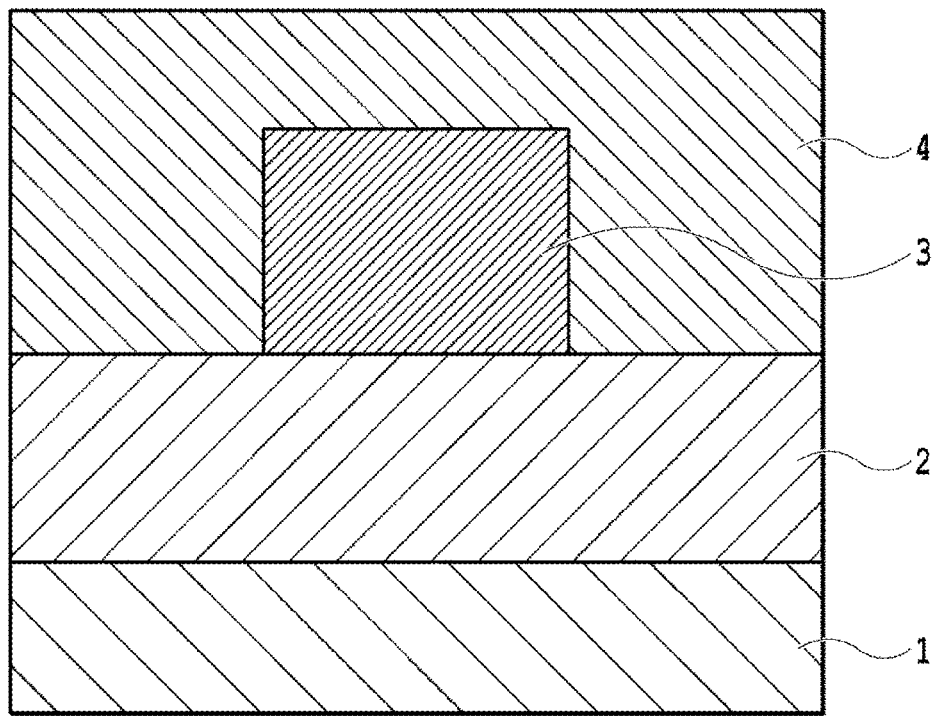
FIG. 1 is a cross-sectional view of a substrate illustrating an example of a cross-sectional structure of a conventional optical waveguide.
Figure 2:
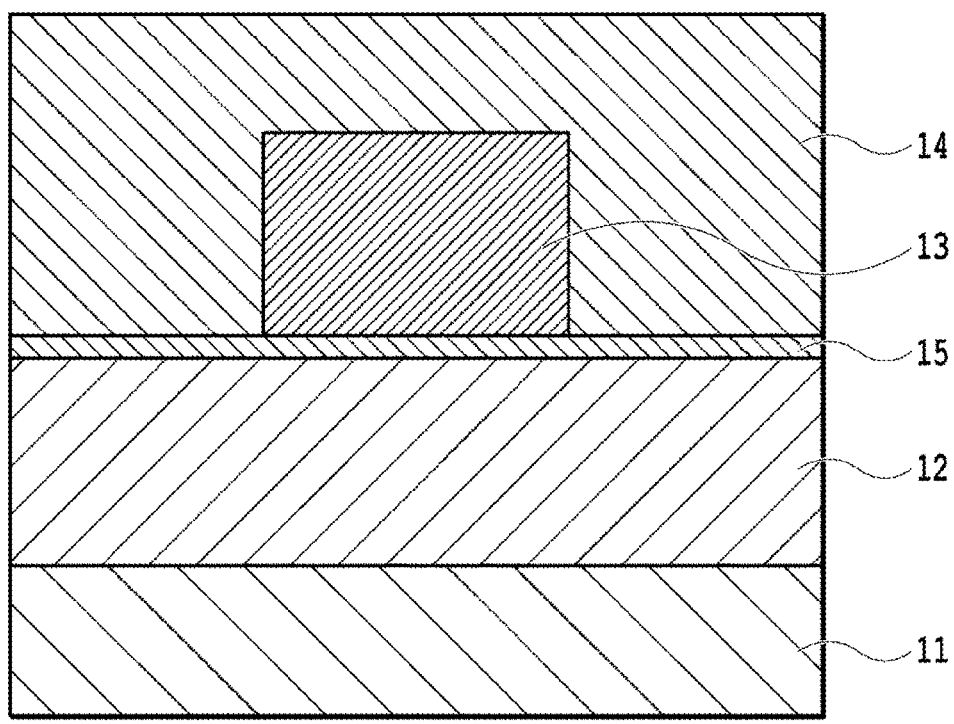
FIG. 2 is a cross-sectional view of a substrate illustrating another example of a cross-sectional structure of a conventional optical waveguide.
Figure 3:
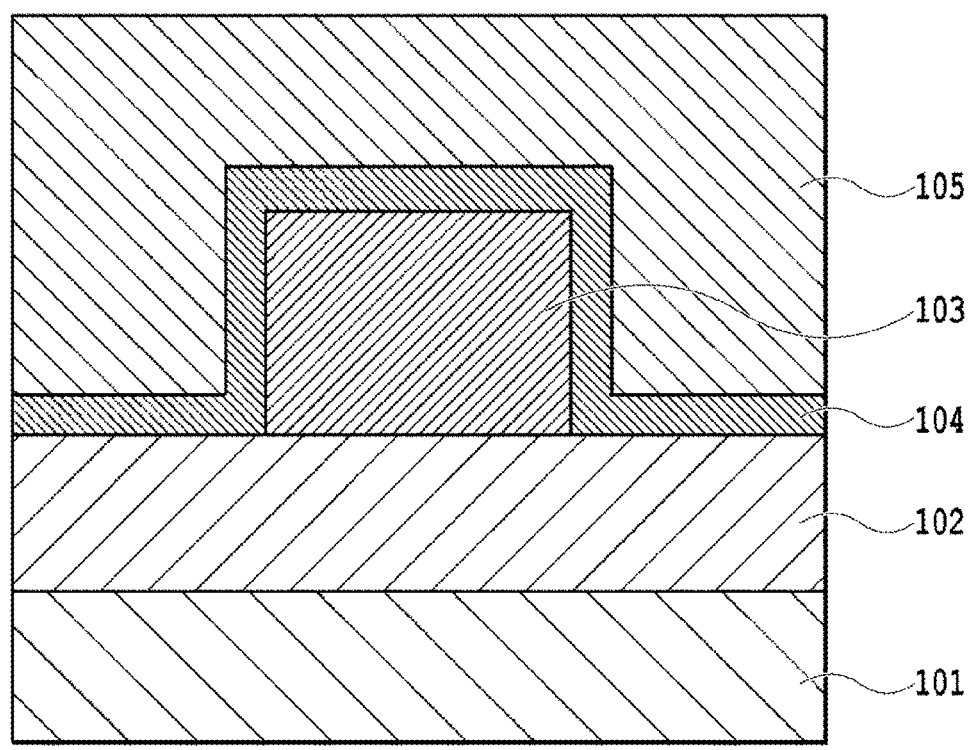
FIG. 3 is a cross-sectional view of a substrate illustrating a cross-sectional structure of an optical waveguide according to an embodiment of the present invention.

FIG. 3 illustrates a cross-sectional structure of an optical waveguide according to the present embodiment. FIG. 3 illustrates an optical waveguide including a support substrate 101, a lower cladding layer 102, a core layer 103, a sinking prevention layer 104, and an upper cladding layer 105. The support substrate 101 is composed of Si, for example. The lower cladding layer 102 is formed on the support substrate 101, and is composed of quartz-based glass having boron or fluorine doped therein, for example. The core layer 103 is formed on the lower cladding layer 102, and is composed of pure quartz glass, for example. The sinking prevention layer 104 is formed on the core layer 103 and the lower cladding layer 102 to cover the core layer 103 and the lower cladding layer 102, and is composed of pure quartz glass, for example. The upper cladding layer 105 is formed on the sinking prevention layer 104, and has boron or fluorine doped therein. The sinking prevention film 104 can float the core layer 103 to raise the core layer 103 by surface tension, and preferably has a thickness that is 5% or less the thickness of the core layer not to affect an optical characteristic.

A method of manufacturing the optical waveguide according to the present embodiment will be described below.

First, quartz-based glass having boron or fluorine doped therein is deposited in a thickness of 20 μm, for example, by a flame hydrolysis deposition method on the substrate 101 having a thickness of 1 mm, to form the lower cladding layer 102.

When pure quartz glass is then deposited on the lower cladding layer 102, the core layer 103 is deposited in a thickness of 4 μm, for example. Then, the core layer 103 is patterned to have a rectangular cross-sectional structure by photolithography and reactive ion etching.

When pure quartz glass is then deposited in a thickness of 0.1 μm, for example, to cover the patterned core layer 103 and the lower cladding layer 102, to form the sinking prevention layer 104. Then, quartz-based glass having boron or fluorine doped therein is deposited in a thickness of 20 μm, for example, by a flame hydrolysis deposition method to have the same refractive index as that of the lower cladding layer 102 on the sinking prevention layer 104, to form the upper cladding layer 105.

In the optical waveguide according to the present embodiment, the sinking prevention layer 104 is formed by deposition on the core layer 103 and the lower cladding layer 102. Accordingly, a variation of the waveguide shape of the optical waveguide in a wafer surface due to a microloading effect and a distribution in the wafer surface of an etching rate at the time of etching, which is concerned about in the method of producing the optical waveguide in Patent Literature 2, is prevented, enabling the yield of a chip to be improved.

The core layer 103 is prevented from sinking using surface tension acting on the sinking prevention layer 104 having a significantly small thickness, enabling a lower loss of a visible light waveguide.

Although the sinking prevention layer 104 is composed of pure quartz glass in the present embodiment, the sinking prevention layer 104 may be composed of quartz-based glass having $Al_2O_3$ doped therein, for example. A material for and a thickness of the sinking prevention layer 104 are determined from a combination of respective thicknesses of materials each having a higher melting point than that of the lower cladding layer 102 and not affecting an optical characteristic of the waveguide.

Although the upper cladding layer 105 is configured to have the same refractive index as that of the lower cladding layer 102 in the above-described embodiment, the upper cladding layer 105 may be configured such that the lower cladding layer 102 and the upper cladding layer 105 have different refractive indexes if the refractive index thereof is lower than that of the core layer 103. The lower cladding layer 102 and the upper cladding layer 105 may be the same as or different from each other.

Although quartz-based glass is used as a material for the waveguide in the above-described embodiment, the applicable range of the present invention is not limited to the material. When a melting point of a material composing the lower cladding layer is lower than a melting point of a material composing the core layer and if the waveguide requires a production process including thermal treatment at a temperature in the vicinity of a melting point of the lower cladding layer, any material composing the waveguide is also a material to which the present invention is applied.

INDUSTRIAL APPLICABILITY

According to the invention, there can be provided an optical waveguide for visible light the loss of which can be reduced by preventing a core layer from sinking into a lower cladding layer in thermal treatment and the optical waveguide shape of which is prevented from varying in a wafer surface due to a microloading effect and a distribution in the wafer surface of an etching rate, and a method of manufacturing the same.

The invention claimed is:

1. An optical waveguide comprising:
a substrate;
a lower cladding layer formed on the substrate;
a core layer formed on the lower cladding layer;
a sinking prevention layer formed to cover the core layer and the lower cladding layer; and
an upper cladding layer formed on the sinking prevention layer,
wherein the sinking prevention layer is composed of a material having a higher melting point than that of a material composing the lower cladding layer, and
wherein the sinking prevention layer is composed of a material that causes the core layer to raise by surface tension acting on the sinking prevention layer.

2. The optical waveguide according to claim 1, wherein the sinking prevention layer has a smaller thickness than a thickness of the core layer.

3. The optical waveguide according to claim 1, wherein the core layer is composed of pure quartz glass.

4. The optical waveguide according to claim 1, wherein the lower cladding layer and the upper cladding layer are each composed of quartz-based glass having a dopant added thereto.

5. The optical waveguide according to claim 4, wherein the dopant contains at least either boron or fluorine.

6. A method of manufacturing an optical waveguide, the method comprising:
forming a lower cladding layer on a substrate;
forming a core layer on the lower cladding layer;
patterning the core layer to have a rectangular cross-sectional structure;
forming a sinking prevention layer to cover the patterned core layer and the lower cladding layer; and
forming an upper cladding layer on the sinking prevention layer,
wherein the sinking prevention layer is composed of a material that causes the core layer to raise by surface tension acting on the sinking prevention layer.

7. The method of manufacturing the optical waveguide according to claim 6, wherein the sinking prevention layer is composed of a material having a higher melting point than that of a material composing the lower cladding layer, and is formed to have a smaller thickness than a thickness of the core layer.

8. The method of manufacturing the optical waveguide according to claim 7, wherein the sinking prevention layer is formed by deposition to cover the core layer and the lower cladding layer.

9. The optical waveguide according to claim 2, wherein the core layer is composed of pure quartz glass.

10. The optical waveguide according to claim 2, wherein the lower cladding layer and the upper cladding layer are each composed of quartz-based glass having a dopant added thereto.

11. The optical waveguide according to claim 3, wherein the lower cladding layer and the upper cladding layer are each composed of quartz-based glass having a dopant added thereto.

* * * * *